Nov. 14, 1944. C. F. SHEPARD 2,362,588
DEVICE FOR MEASUREMENT OF STEREOSCOPIC VISION
Filed June 22, 1942 4 Sheets-Sheet 1
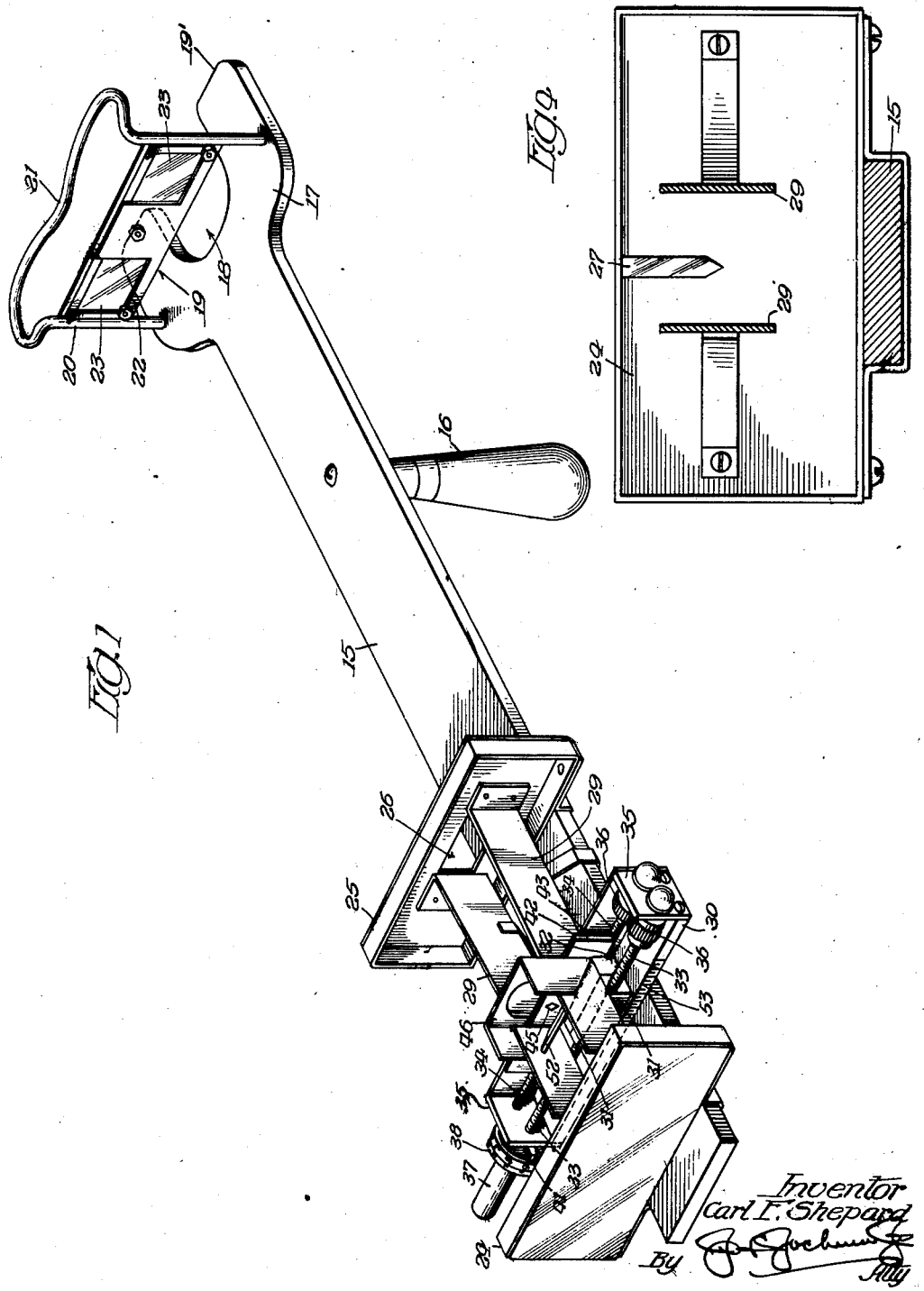

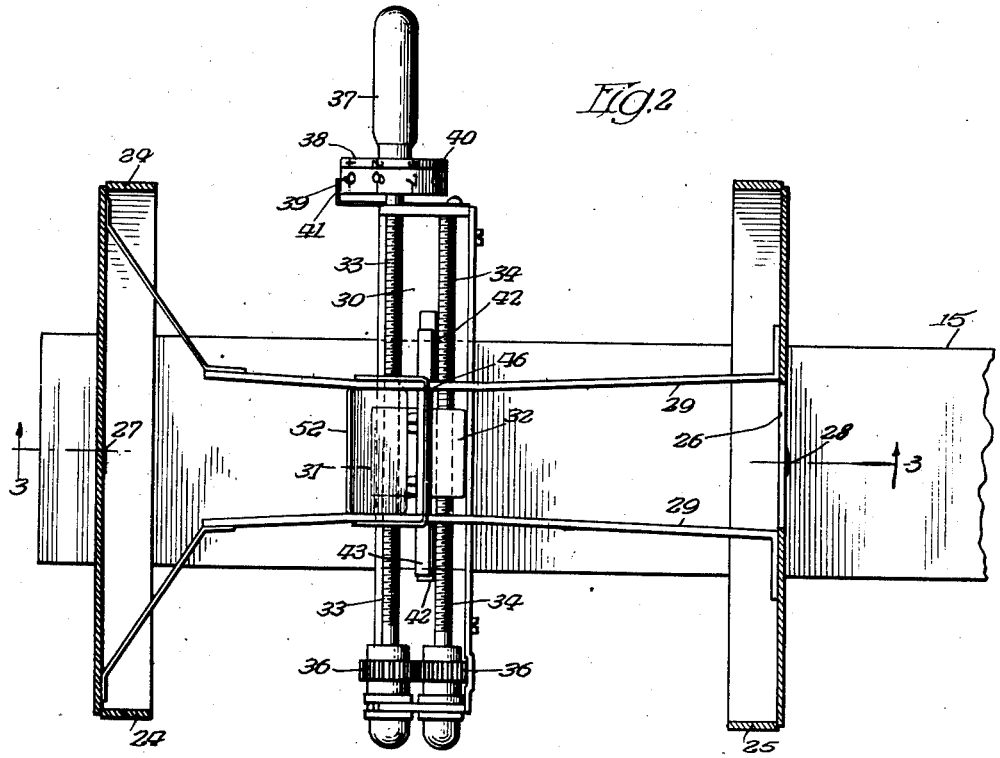
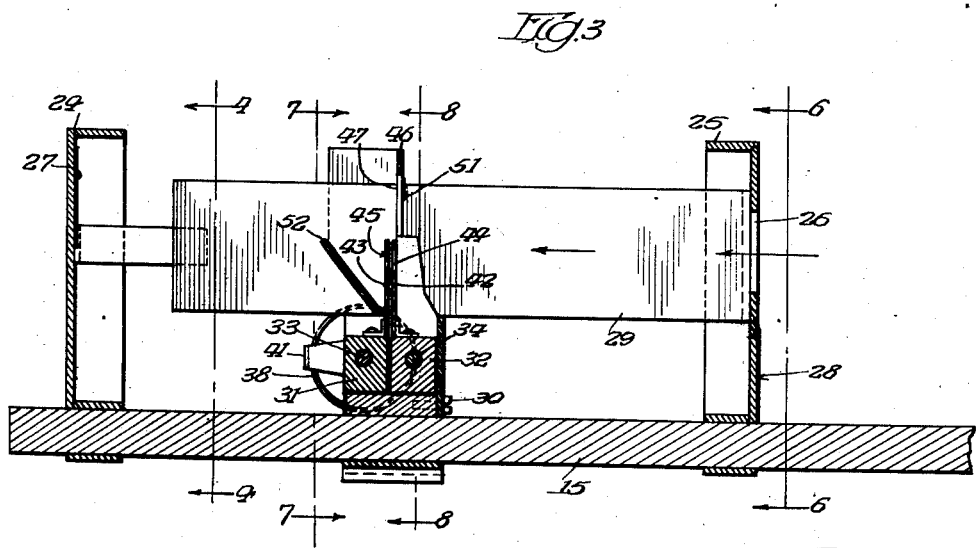

Nov. 14, 1944.   C. F. SHEPARD   2,362,588
DEVICE FOR MEASUREMENT OF STEREOSCOPIC VISION
Filed June 22, 1942   4 Sheets-Sheet 3
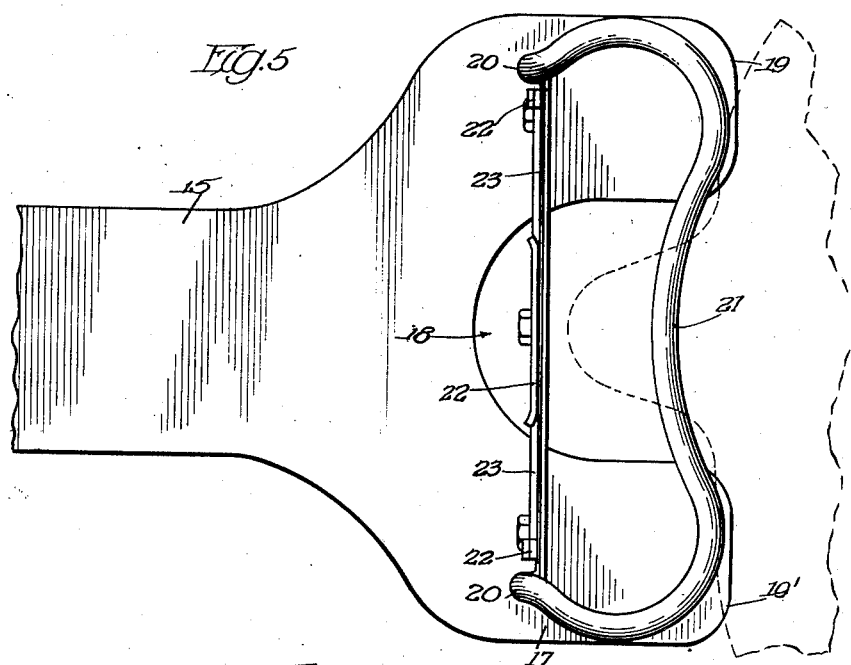
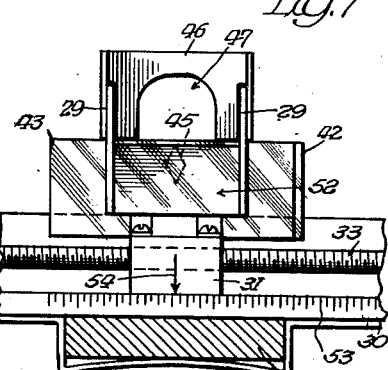
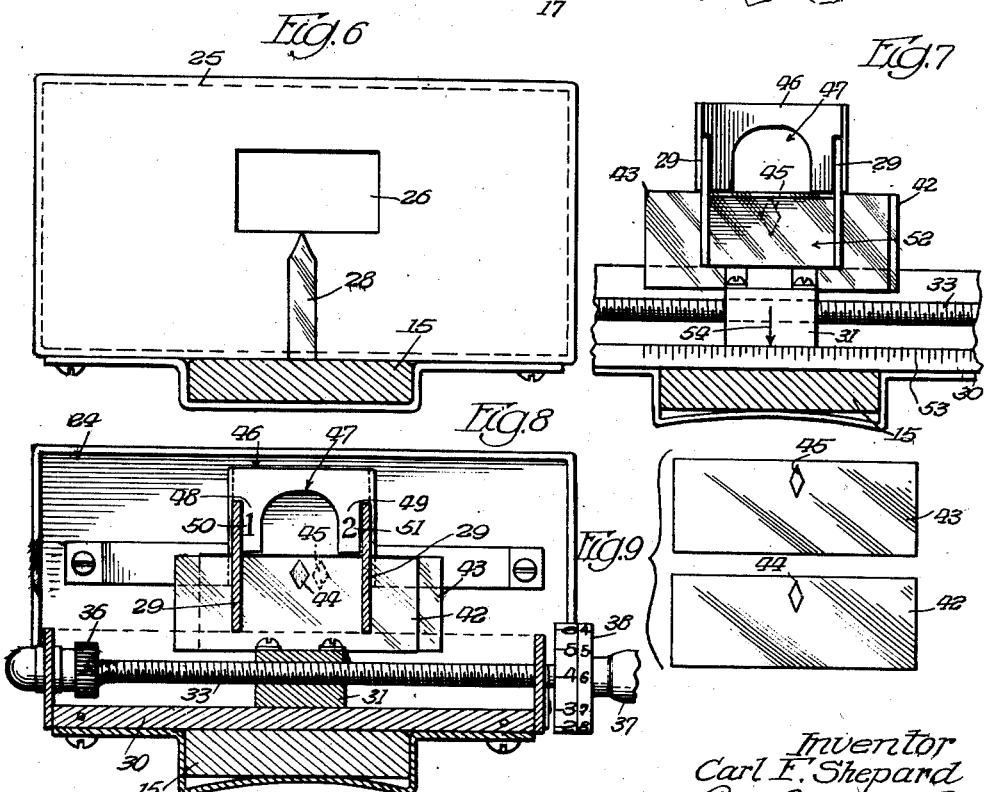
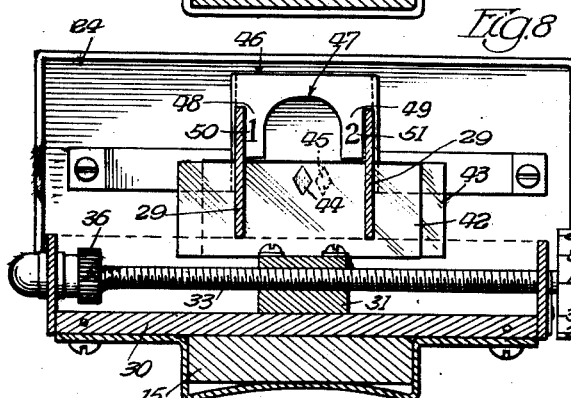
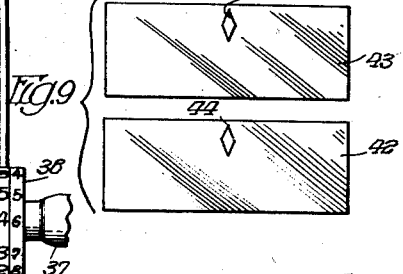
Inventor
Carl F. Shepard

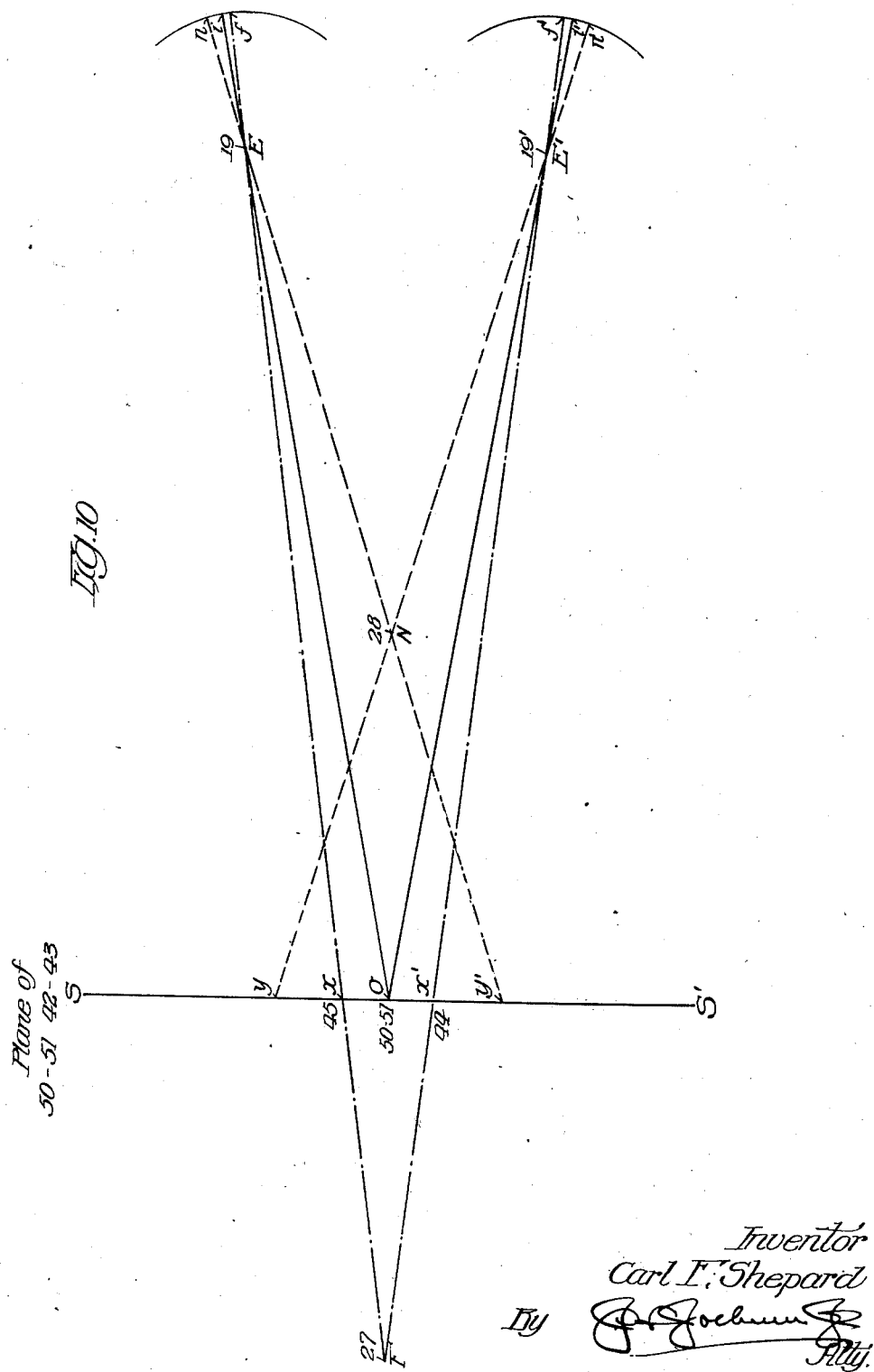

Patented Nov. 14, 1944

2,362,588

UNITED STATES PATENT OFFICE 2,362,588

DEVICE FOR MEASUREMENT OF STEREOSCOPIC VISION

Carl F. Shepard, Chicago, Ill., assignor of one-half to Donald P. Mossman, Sr., Park Ridge, Ill.

Application June 22, 1942, Serial No. 448,035

3 Claims. (Cl. 88—20)

This invention relates, in general, to improvements in eye testing, but more specifically for determining errors of stereopscopic vision ("stereopsis"), relative to objects at any desired distance. To appreciate the objects, merits and advantages of the present invention, it is necessary to distinguish between three faculties or abilities of the eyes, commonly referred to as perspective, stereopsis, and distance judgment.

According to the dictionary definitions, there seems to be no distinction made between perspective and stereoscopic vision, the latter being generally known as "stereopsis." However, in optometry, ophthalmology, and like sciences, there is need for such distinction. "Perspective" is recognized as that visual appreciation of three-dimensional form, etc., which may be had by a person seeing with only one eye, and may be produced by an artist on a canvas or other flat surfaces.

"Stereopsis" is that additional visual appreciation of three-dimensional form, etc., which can be had only by a person employing both eyes as a single, almost perfectly co-ordinated "seeing unit" (not always then), and may be produced in art only by sculpture and three-dimensional art work. In photography, this may only be done by the use of two photographs taken from slightly different angles, and some means for presenting each of the photographs to corresponding members of a pair of human eyes.

The practical advantage of stereopsis over perspective vision is that "depth," or the three-dimensional property of objects viewed, is perceived instantly, as rapidly as sight itself, by one having excellent stereopsis, and even when both objects and observer are motionless, whereas perspective recognition of three-dimension property or quality requires time for comparison and judgment, such as relative apparent size of familiar objects; objects in the foreground overlapping those in the background; the greater brightness of near objects, and other comparisons.

There is a distinct and practical advantage in being able to measure this superior visual ability designated as "stereopsis," as distinct from the measurement of visual recognition of three-dimensional form by "perspective vision."

Heretofore, it has been attempted to accomplish these results by the employment of devices or apparatus embodying objects which are moved to and from the observer along parallel lines, but such apparatus have two inherent faults relative to stereopsis measurement. If, in the employment of such apparatus, time is allowed, even a person with only one eye can make accurate judgment based upon, first, comparative size, brightness, etc.; or, second, on movement parallax; i. e., the fact that more remote objects appear to follow movements of the observer, while near objects stand still or appear to move in a direction opposite to the motion of the observer. Therefore, persons with no stereopsis whatever may be able to pass tests with such devices, because of a special highly developed appreciation of "perspective" factors.

Devices or apparatus for measuring stereopsis based on two photographs taken from slightly different angles have at least three faults: (1) In the art of photography, by reason of the possibility of films or prints stretching, it is not possible to produce photographs with such accuracy as to insure invariably uniform graduations without extreme care, so that only the best photography is dependable. (2) That the gaze of the observer may remain substantially straight ahead, while a substantially wide range of measurement is covered, these "stereograms" must be presented in series, and each stereogram of a series must be like all the others in brightness, etc. (3) The stereogram is limited to one background (that of the basic photograph combined with the artificial environment of the device or apparatus through which the stereogram is viewed).

Stereopsis relative to remote objects, and relative to near-by objects, cannot be compared with stereograms, all of which are presented relatively close to the eyes. Actual tests and experiments have shown that a person may have precise stereopsis of objects near-by, but poor stereopsis of remote objects, and vice versa. It has been found that by the employment of the present standards, all persons have relatively poor stereopsis of remote objects and better stereopsis of nearer objects.

It is therefore one of the objects of the present invention to overcome all of these difficulties and objections, and to provide an improved device or apparatus for causing an apparent movement of an apparent object toward and away from the observer, provided the observer employs both of his eyes as a single seeing or viewing unit.

With the present invention, if either eye be occluded or ignored, the apparent movement becomes wholly, or in part, transverse to the line of sight. Thus, by means of the employment of the present invention it may be determined at what moment, and under what circumstances, the subject being tested begins substituting "perspective" for "stereopsis," and vice versa. Furthermore, the present invention provides for the observation of actual objects, exceedingly remote or near-by, the location of which may be determined by any means desired; i. e., perspective, or even actually reaching out to touch the real or stationary objects. Thus, with the present invention, if the subject's stereopsis is affected by poor distance judgment, the fact will become apparent. It is well known that some persons habitually use both eyes for far-seeing, but only one eye for near or close-seeing, and vice versa. However, with the present invention and improved apparatus, such habits will be quickly detected.

With the present invention, the distance from the center of rotation of the line of vision of one eye to the center of rotation of the line of vision of the other eye may be determined by having the subject aline first one and then the other of the actually transversely moving objects or targets with a given actual object. In each instance, the companion eye should be covered. This "alinement" or "micrometer vision" is the most critical of all visual skills. When this has been accomplished, the instrument readings which the "apparent object" should appear to be, at any given predetermined distance from the object, will be known. For example, if each transverse target or object be alined with an object at "X" distance, while one eye is occluded or covered during such alinement, the instrument readings will thereby determine when the "apparent objects" should appear to be at "X" distance when both eyes are employed for the purpose of stereopsis.

While in the present exemplification of this invention the above has been shown, described and claimed in connection with the measurement of stereoscopic vision ("stereopsis"), it is to be understood that the invention is not to be so specifically limited, as it is well adapted for other purposes. Therefore, the claims are to be construed broadly, and not to be limited to this specific use.

To the attainment of these ends and the accomplishment of other new and useful objects as will appear, the invention consists in the features of novelty in substantially the construction, combination and arrangement of the several parts, hereinafter more fully described and claimed and shown in the accompanying drawings illustrating one exemplification of this invention, and in which:

Fig. 1 is a perspective view of an apparatus of this character, constructed in accordance with the principles of this invention and as viewed from the rear end of this apparatus.

Fig. 2 is a top plan view of Fig. 1, on an enlarged scale, with parts omitted, parts broken away, and parts in section.

Fig. 3 is a longitudinal sectional view taken on line 3—3, Fig. 2.

Fig. 4 is a detail vertical sectional view, on an enlarged scale, taken on line 4—4, Fig. 3.

Fig. 5 is a top plan view, on an enlarged scale, of the end of the apparatus which is placed against the subject's face.

Fig. 6 is a detail sectional view taken on line 6—6, Fig. 3.

Fig. 7 is a detail sectional view taken on line 7—7, Fig. 3, looking in the direction of the arrows.

Fig. 8 is a detail sectional view taken on line 8—8, Fig. 3, looking in the direction of the arrows.

Fig. 9 is an elevation of the elements which co-operate to form the transversely moving target.

Fig. 10 is a diagrammatic view illustrating the manner of operation of this invention.

As shown in the drawings, the various elements of the instrument are mounted upon a supporting member 15, preferably comparatively long with respect to its width, and connected to the supporting member for holding the same in position is a handle 16 that is disposed intermediate the ends thereof. The forward end of the supporting member 15 is preferably enlarged, as at 17, and is provided with a bifurcation 18, to form the ends 19—19' that are adapted to engage and rest against the face of the subject below the eyes.

Supported adjacent the bifurcated end is another member 20, the body 21 of which is spaced above the supporting member 15, and is curved inwardly, slightly, so that it will engage and rest against the forehead of the subject above the eyes. With this construction, and as the front of the support has two spaced points of contact with the face of the subject, it will be manifest that as the support is held by the handle 16 and against the face, the support will not be rocked with respect to the face of the subject, but with such an arrangement there will always be maintained a fixed relationship between the end of the support and the face of the subject, and consequently with respect to the subject's eyes.

Mounted upon the member 20 and extending transversely of the support 15 is a holder 22 in which is arranged filters 23, preferably formed of material well known to the trade as "Polaroid."

The support 15 may be of any desired length, and mounted upon the other end thereof and spaced in a direction lengthwise of the support are screens 24, 25, the forward screen 25 being provided with an opening 26 therethrough, to permit a vision of the rear screen 24. Carried by the screen 24 and in alinement with the opening 26 of the screen 25 is a target 27 constituting an actual target, and carried by the front of the foremost screen 25 is a similar target 28. These actual targets 27, 28 are preferably arranged in planes one above the other, the target 28 being preferably disposed below the opening 26 in the screen 25, while the target 27 on the screen 24 is disposed above the target 28 and is visible through the opening 26.

These screens 24, 25 may be maintained in fixed spaced relation with respect to each other in any desired or suitable manner, preferably by means of spacing members 29 arranged on opposite sides of the opening 26, but in such positions that the vision of the target 27 through the opening 26 will not be obstructed.

A supplemental support 30 is mounted upon the main support 15 in any desired or suitable manner to extend across the support 15, and is disposed between the screens 24, 25, being suitably spaced from both. Slides 31, 32 are mounted upon the supplemental support 30, and individual to these slides are screw-threaded shafts 33, 34, the shafts being journaled in end members 35 carried by the supplemental support 30. Connected to each of the shafts is a gear 36 preferably arranged at one end of the shafts and intermeshing with each other. At the other end of one of the shafts, preferably the shaft 33, is an operating handle 37 which carries a dial 38, around the periphery of which is arranged two series of graduations 39, 40, for a purpose to be hereinafter set forth. Co-operating with the graduations is an indicator or pointer 41.

As the shafts 33, 34 are threaded through the respective slides 31, 32 and are geared together by means of the gears 36, it will be manifest that when the handle 37 is rotated to rotate the shaft 33, both of the shafts 33, 34 will be rotated and, the shafts being threaded in opposite directions, will cause a relative movement of the slides 31, 32 in directions lengthwise of the shafts and transverse to the targets 27, 28.

Carried by the slide 31 is an element 42, and carried by the slide 32 is an element 43, which may be constructed of any suitable material which is impenetrable to certain light rays, of which Polaroid is one. When Polaroid is employed, each transversely moving target has grains or axes of polarization parallel to grain or axis of polarization of Polaroid before the respective eyes. These elements 42, 43 are so mounted upon their respective slides that they will rest against each other, and they are respectively provided with openings 44, 45 therethrough, so that when the elements 42, 43 are mounted upon the slides and arranged with their faces in contact with each other, the openings 44, 45 may be moved into and out of register with each other. When the openings are in registration, the subject may see therethrough with both eyes, but when they are displaced laterally with respect to each other by the relative movements of the elements 42, 43, the opening in each member will render a portion of the other member translucent to one eye only. These two members in their association constitute an apparent target constituting two co-operating targets which are moved transversely of, or at right angles to the line of vision through the opening 26 in the screen 25 to the target 27 in the screen 24.

Disposed between the screens 24, 25 is shield 46 which constitutes an actual target and is spaced from each of the screens 24, 35. This shield 46 is preferably cut away, as at 47, to provide portions 48, 49 on which is arranged the actual target elements 50, 51. The cut-away portion 47 is provided so as not to obstruct the vision of the target 27, and the targets 50, 51 appear on the shield 46 and are displaced laterally with respect to the targets 27, 28, so that all of the actual targets will be visible through the opening 26 in the screen 25. The target consisting of the elements 42, 43 is preferably arranged beneath the shield 46, and the opening 47 is of considerable size to permit of a considerable movement of the elements 42, 43 before either of the openings 44, 45 will be moved into the respective planes of the portions 48, 49, according to the direction of relative movement of the elements 42, 43.

This shield 46 may be supported in any suitable manner and, if desired, and in order to brighten the targets 50, 51, a reflector 52 may be provided and suitably placed.

Al of the targets and the supplemental support 30 may, if desired, be mounted upon the support 15 in any suitable manner, so that they may be adjusted as a unit in directions lengthwise of the support.

Along one edge of the supplemental support 30 there is provided a scale or graduations 53, with which an indicator 54 on the slide 31 co-operates to indicate the movement of the slides.

In use, the co-operating targets or elements 42, 43 are adjusted with respect to each other, so that the openings 44, 45 will be in register. The subject then holds the support 15 by means of the handle 16, placing the extremities 19 thereof against the cheeks, below the eyes, while the member 21 rests against the forehead. With his other hand, or, if desired, by a separate operator, the handle 37 is rotated to cause the elements 42, 43 to be shifted with respect to each other across or at right angles to the line of vision or gaze of the subject while he observes directly either of the fixed targets 27 or 28. During this operation, apertures or openings (one in each of the elements 42—43, and being identical in form and size) are moved towards or away from each other, in a plane normal to the line of vision of the subject. The aperture in one of the elements is visible to one eye only, and the aperture in the other of the elements is visible only to the other eye, because of the relationship between the polarizing axes of the elements 42—43 with relation to the respective axis of the element 23 right and 23 left. Because of the facts as stated, the image received by the right eye of the subject and the image received by the left eye, are normally fused into a single mutual image projected into space, and, during the described operation, this projected image appears to move towards and away from the subject, according to the direction of relative movement of the elements 42—43. The movement of the mentally projected image should be continued until it appears to be in a plane at a predetermined point at a distance other than the plane of the target apertures 44—45, such as either of the fixed targets 27—28, toward which the subject's attention has been directed. When they do assume such position, then the reading is taken upon the dial 38 and the graduations 53 on the supplemental support 30, and from such graduations it will be determined at what moment, and under what circumstances, the subject being tested begins substituting perspective for stereopsis, and vice versa.

The fixed targets 27, 28 and the fixed targets 50, 51 on the element 46, are at all times employed in connection with the openings 44—45 in the elements 42, 43. The projected image of the apertures 44—45 can be caused to move to or from the subject, and stop in a plane with the fixed target 27, or fixed target 28, or fixed targets 50 and 51, or any other real object within the subject's field of view.

The manner of operation of this device will be explained in connection with the diagram shown in Fig. 10, and in such explanation reference letters will be employed, and the corresponding reference figures or characters employed in the description of the apparatus will also be found in said diagram.

In the diagram, the points represented are as follows:

$E(19)$—The nodal point of the right eye.
$E'(19')$—The nodal point of the left eye.
$S$—$S'$—A plane, substantially parallel to the plane including the nodal points $E$—$E'$, including the elements 50—51 and 42—43.
$F(27)$—An actual object farther from the eyes than $O$.
$O(50$—$51)$—An actual object fixated by both eyes so that line $O$—$E$ is line of direct vision for right eye, and line $O$—$E'$ is line of direct vision for left eye.
$N(28)$—An actual object nearer to the eyes than the object $O$.
$n$—Image of object $N$ on retina of right eye.
$n'$—Image of object $N$ on retina of left eye.
$i$—Image of object $O$ on retina of right eye.
$i'$—Image of object $O$ on retina of left eye.
$f$—Image of object $F$ on retina of right eye.
$f'$—Image of object $F$ on retina of left eye.

When a pair of eyes are directed towards an object such as $O(50$—$51)$, an image of that object is formed at the fovea centralis (center of direct vision) of each eye, by means of pencils or cones of light, the principal axes of which pass through the nodal points of the two eyes E—E' (19—19'). Sensory impulses from each fovea (i—i') reach, eventually, identical points in the brain, resulting in a single mental image of O.

It is well known that nerve fibers from the right half of each eye (to the right of the fovea centralis) pass to the right half of the brain, and that nerve fibers from the left half of each eye pass to the left half of the brain. Consequently, as the images in each eye of a more distant object, such as F(27) are formed by pencils of light, the principal axes of which pass through the respective nodal points (E—E'), the image of F in the right eye ($f$) is formed to the left of the fovea, while the image of F in the left eye ($f'$) is formed to the right of the fovea. The reverse situation exists regarding the images of the object such as N(28), which is closer to the eyes than O. Consequently, when seeing O by direct vision as a single object, using both eyes of a normal pair, there must be physiologically and optically double vision of objects such as F and N, which are substantially on a line median to E—E'. This double vision can readily be demonstrated to one with substantially normal eyes. However, human intelligence permits one to interpret this physiological diplopia in terms of the true state of affairs; i. e., a single object farther away from the eyes than O, or a single object nearer to the eyes than O, rather than as two objects in the plane of F, or two objects in the plane of N; provided that the distances F—O and O—N are not so great that (1) the images $n$ and $f$ are not too badly out of focus for practical recognition, and (2) that the distances $n$—$i$, $f$—$i$, $f'$—$i'$, and $n'$—$i'$ are not too great.

This resolving of slightly disparate images into perception of spaced relationships is called "stereopsis."

In the present invention, means are provided for placing an actual object on a plane S—S' (the plane including the elements 50—51 and 42—43), which object is visible to the right eye only, and another identical actual object on plane S—S' at $x'$, which latter object is visible to the left eye only. This is accomplished by Polaroid sheets 42—43, before the eyes, and which sheets are provided with the apertures 44—45. This could also be accomplished by complementary color filters supporting these targets and before the eyes in each instance. Within certain limits relative to blurred images and the point O of actual fixation of the two eyes, the images within the two eyes of $x$ and $x'$ produce precisely the effects of an object at F.

When $x$ and $x'$ meet at the median line, they produce the effects of, or actually become an object at O. When they have passed each other at the median line, so that $x$ assumes the position of $y'$ and $x'$ assumes the position of $y$, their respective images produce the effects of an object at N.

By having such objects as $x$ and $x'$ moving, as described, in the plane S—S', and a series of actual objects each of which is actually visible to both eyes corresponding to F, O and N, and by having an accurately calibrated scale to show the lateral positions of $x$ and $x'$, in combination with knowing the precise locations of the real objects corresponding to F, O, and N, it is possible and practical to measure the accuracy of stereopsis or "vision of special relations" by having the subject report when the apparent "object" resulting from the combined effects of $x$ and $x'$ appears to be precisely at the same distance of an actual object such as F, O, or N.

Conversely, when the subject is known to have highly accurate stereopsis, and his distance E—E' has been accurately determined by any of several possible means, some of which can be applied with this same device, it is possible to determine the distance of a remote object such as F, by adjusting $x$ and $x'$ until the $x$—$x'$ apparent object appears to be at a distance equal to the distance of the remote object F.

The determination of the distance E—E' for any subject is a matter of simple calculations from a series of alining $x$ with objects such as F, O, and N, while the left eye is covered or closed, and then alining $x'$ with the same objects before the head is moved and while the right eye is occluded. When the distances from the plane S—S' of objects such as F and N are known, and the positions of the targets 44—45 have been determined, so that the projected image appears to be in the plane of target F, as previously described, the lines F—X' and F—X may be extended to the right in Fig. 10. Likewise, the position of the targets $y$—$y'$ may be determined relative to object N.

If line $y'$—N is extended to intersect the extension of the line F—X, and the line $y$—N is extended to intersect the extension of the line F—X', points E and E' will have been located, which points are the centers of rotation of the lines of vision, approximately the nodal points. In the fitting of glasses and other optical devices for the aid of vision, it is frequently important to locate these points with greater accuracy and facility than has heretofore been done.

Furthermore, if an $x$ be provided which is above or below, or in shape completely incompatible with the corresponding $x'$, the relative "muscle balances," technically called "heterophorias," can be measured.

By the use of the term "opposite light transmission properties" employed in the claims, is meant that light having passed through one of the elements 42—43, will then not pass through the other element. That is, the two elements 42, 43, in combination, are opaque, but light will pass through one aperture and also through the portion of the other element adjacent such aperture, or through both apertures when they are in registration.

While the preferred form of apparatus for carrying this invention into operation has been herein shown and described, it is to be understood that various changes may be made in the details of construction and in the combination and arrangement of the several parts, within the scope of the claims, without departing from the spirit of this invention.

What is claimed as new is:

1. In an apparatus of the character described for determining the accuracy of spaced relationships, the combination of two elements of opposed light transmission properties, each of which elements is provided with a target aperture, said apertures being normally out of register, and each target being substantially identical in shape and size, two additional elements, each of which has the same properties of light transmission as one of the first recited elements, one of the second recited elements being individual to each eye of the observer, and means for relatively moving said target apertures in the plane of the first said elements, to cause said target apertures to be moved into and out of registration, substantially across the line of vision of the subject, whereby the direction of light rays entering each eye from its corresponding target aperture may be controlled, the position of the target apertures with relation to each other serving to determine the relative direction of the line of vision of each eye, at the time when the subject mentally fuses the two retinal images into one mental image projected into space, while maintaining binocular single vision of a predetermined point at a distance other than the plane of the target apertures.

2. In an apparatus of the character described for determining the accuracy of spaced relationships, the combination of two elements of opposed light transmission properties, each of which elements is provided with a target aperture, said apertures being normally out of register, and each target being substantially identical in shape and size, two additional elements, each of which has the same properties of light transmission as one of the first recited elements, one of the second recited elements being individual to each eye of the observer, means for relatively moving said target apertures in the plane of the first said elements, to cause said target apertures to be moved into and out of registration, substantially across the line of vision of the subject, whereby the direction of light rays entering each eye from its corresponding target aperture may be controlled, the position of the target apertures with relation to each other serving to determine the relative direction of the line of vision of each eye, at the time when the subject mentally fuses the two retinal images into one mental image projected into space, while maintaining binocular single vision of a predetermined point at a distance other than the plane of the target apertures, and additional targets or real objects in space, visible through both of the second recited elements, so positioned with respect to the first recited elements, that light rays reaching the eyes from said additional targets do not pass through the first said elements.

3. In an apparatus of the character described for determining the accuracy of spaced relationships, the combination of two elements of opposed light transmission properties, each of which elements is provided with a target aperture, said apertures being normally out of register, and each target being substantially identical in shape and size, two additional elements, each of which has the same properties of light transmission as one of the first recited elements, one of the second recited elements being individual to each eye of the observer, means for relatively moving said target apertures in the plane of the first said elements, to cause said target apertures to be moved into and out of registration, substantially across the line of vision of the subject, whereby the direction of light rays entering each eye from its corresponding target aperture may be controlled, the position of the target apertures with relation to each other serving to determine the relative direction of the line of vision of each eye, at the time when the subject mentally fuses the two retinal images into one mental image projected into space, while maintaining binocular single vision of a predetermined point at a distance other than the plane of the target apertures, and measuring means operatively related to the first said elements for determining their relative positions.

CARL F. SHEPARD.